United States Patent [19]
Sato

[11] Patent Number: 6,058,165
[45] Date of Patent: May 2, 2000

[54] TELEPHONE APPARATUS WITH RECORDING FUNCTION

[75] Inventor: Yukio Sato, Yokohama, Japan

[73] Assignee: Matsushita Electric Industrial Co., Ltd., Japan

[21] Appl. No.: 08/842,521

[22] Filed: Apr. 24, 1997

[30] Foreign Application Priority Data

May 28, 1996 [JP] Japan ................................ 8-133518

[51] Int. Cl.[7] .......................... H04M 1/64; H04M 11/00; H04M 1/00
[52] U.S. Cl. ...................... 379/88.07; 379/391; 379/67.1
[58] Field of Search ............... 379/67.1, 88.02, 379/88.07, 88.13, 93.08, 88.26, 88.27, 93.06, 157, 338, 339, 391, 388, 406, 410

[56] References Cited

U.S. PATENT DOCUMENTS

| | | | |
|---|---|---|---|
| 4,397,030 | 8/1983 | Becker et al. | 375/36 |
| 4,575,584 | 3/1986 | Smith et al. | 179/81 |
| 4,928,306 | 5/1990 | Biswas et al. | 379/201 |
| 5,003,576 | 3/1991 | Helferich | 379/88 |
| 5,081,679 | 1/1992 | Dent | 380/48 |
| 5,267,299 | 11/1993 | Nomura | 379/88.02 |
| 5,289,528 | 2/1994 | Ueno et al. | 379/67.1 |
| 5,333,176 | 7/1994 | Burke et al. | 379/58 |
| 5,483,577 | 1/1996 | Gulick | 379/67 |
| 5,504,806 | 4/1996 | Kawakami | 379/67 |
| 5,570,411 | 10/1996 | Sicher | 379/57 |
| 5,666,370 | 9/1997 | Ganesan et al. | 371/37.01 |
| 5,799,244 | 8/1998 | Matsumoto | 455/67.3 |
| 5,815,503 | 9/1998 | Li | 370/471 |

FOREIGN PATENT DOCUMENTS

| | | |
|---|---|---|
| 0 642 286 A2 | 3/1995 | European Pat. Off. . |
| 0 762 711 A2 | 3/1997 | European Pat. Off. . |
| 7-235 977 | 9/1995 | Japan . |
| 8-289002 | 11/1996 | Japan . |

*Primary Examiner*—Allan Hoosain
*Attorney, Agent, or Firm*—Parkhurst & Wendel, L.L.P.

[57] ABSTRACT

A 1st telephone apparatus comprises a transmission system for transmitting a transmission voice SIG to a network, a receiving system for receiving a reception voice SIG from the network, a recording system for generating a recording SIG derived from the voice SIGs from the transmission and the receiving system, a memory for storing and reading the recording SIG, and a switch for playing back the reception voice SIG in a communication mode and playing back the recording SIG from the memory in a playback mode. Coding and decoding may performed by a single DSP through a time division manner. A 2nd telephone apparatus comprises a transmission and receiving systems, 1st and 2nd switches, a memory circuit, and a voice presence detector for detecting the presence of the voice SIG of the transmission system, the 1st switch stores the voice SIG from the voice SIG from the transmission system prior to the voice SIG from the receiving system. The 2nd switch provides a playback from the voice SIG from the network directly and from the memory circuit. The 2nd telephone apparatus may further comprise a frame condition detector for detecting a frame condition, a data adder for adding data indicative of the frame condition to reception SIG, and a memory control circuit. The memory control circuit inhibits recording according to the frame condition.

7 Claims, 7 Drawing Sheets

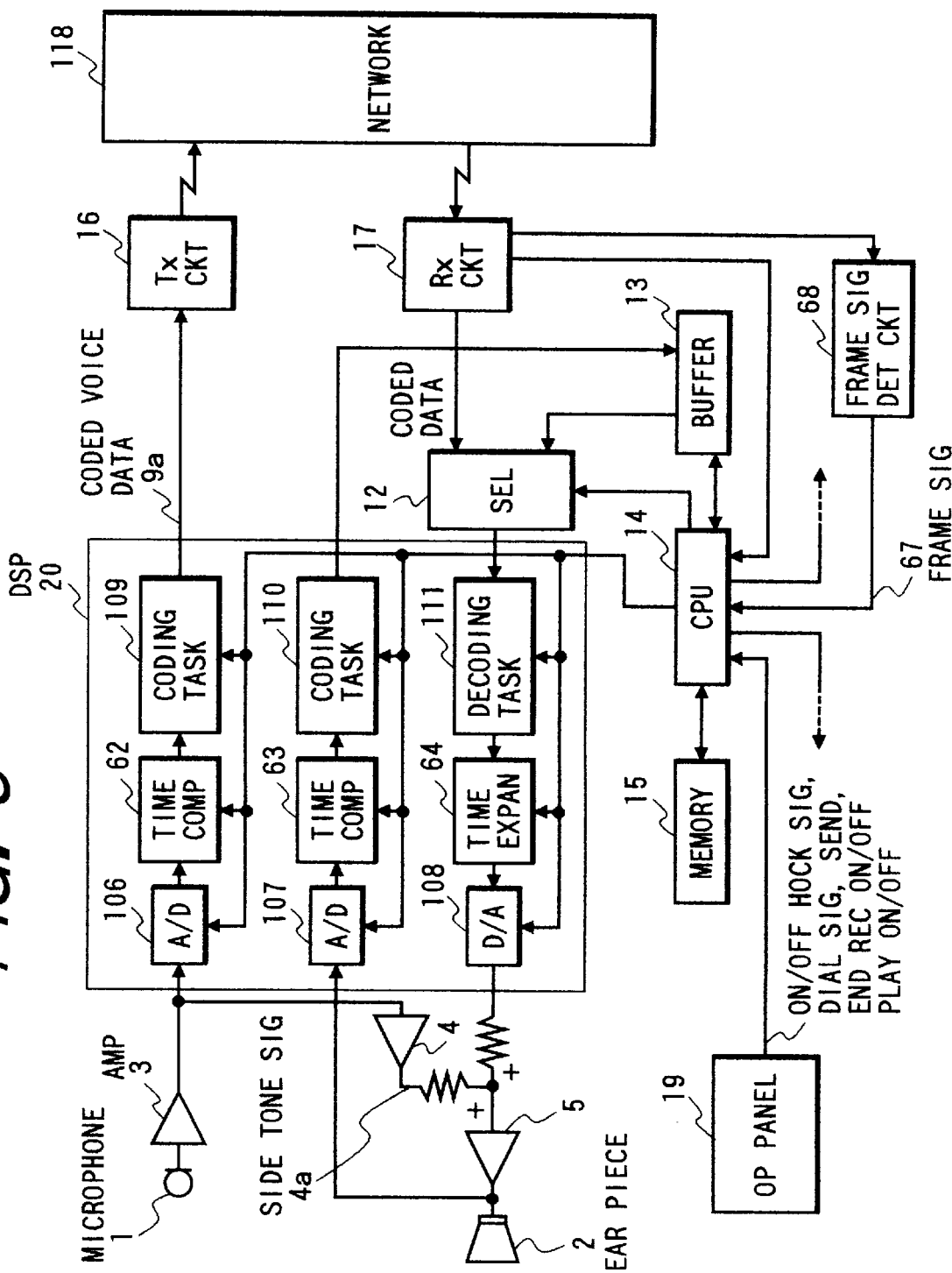

TELEPHONE APPARATUS WITH RECORDING FUNCTION

BACKGROUND OF THE INVENTION

1. Field of the Invention

This invention relates to a telephone apparatus with a recording function.

2. Description of the Prior Art

A telephone apparatus with recording function for transmitting and receiving a telephone signal and for recording a voice signal in the telephone signal is known.

Japanese patent application provisional publication No. 8-289002 discloses a recording and playback apparatus used for a telephone apparatus, which records either of a transmission digital voice signal or a reception digital voice signal in accordance with a comparing result of detected voice levels of the transmission digital voice signal and the reception digital voice signal. Moreover, when both voice levels are lower than a predetermined value, no digital voice signal is recorded to provide a longer recording period.

SUMMARY OF THE INVENTION

The aim of the present invention is to provide an improved telephone apparatus with a recording function.

According to the present invention, a first telephone apparatus with recording and playback functions is provided, which comprises: a microphone for receiving a first voice and generating a first voice signal; a transmission signal processing portion including a first a/d converter for a/d-converting the first voice signal to first voice data, and a first coder for coding the first voice data and generating first coded voice data; a transmission circuit for generating and transmitting a transmission signal from the first coded voice data to a network; a receiving circuit for receiving a reception signal from the network; a memory circuit for storing data and reading the stored data; a switch for outputting either of the reception signal from the receiving circuit or the read stored data; a reception signal processing portion including a decoder for decoding an output of the switch, and a d/a converter for d/a-converting an output of the decoder into an analog voice signal; an adder for adding the first voice signal to the analog voice signal; a voice generating portion for generating and outputting a second voice from an output of the adder; and a recording signal processing portion including a second a/d converter for a/d-converting an output of the adder to second voice data, and a second coder for coding the second voice data and generating second coded voice data, the memory circuit storing the second coded voice data as the data in a recording mode, the memory circuit and the switch supplying the read stored data to the decoder in a playback mode.

The first telephone apparatus may further comprise: a communication detection portion responsive to an operation switch and the receiving circuit for detecting a non-communication condition; and a sleep mode control portion for making the transmission signal processing portion and the reception signal processing portion in a sleeping condition in the detected non-communication condition, making the recording signal processing portion in an operation condition In recording mode, and making the reception signal processing portion in another operation condition in the playback mode to decode the read data from the memory circuit.

According to the present invention, a second telephone apparatus with recording and playback functions for communicating with a digital network is provided, which comprises: a microphone for receiving a first voice and generating a first voice signal; a single digital signal processor including: a transmission signal processing portion including a first a/d converter for a/d-converting the first voice signal to first voice data, a time-compression portion for time-compressing the first voice data to output the first voice data for a first frame timing of voice frame interval, and a first coder for coding the first voice data from the time-compression portion and generating first coded voice data; a transmission circuit for generating and transmitting a transmission signal from the first coded voice data to the network; a receiving circuit for receiving a reception signal from the network; a memory circuit for storing data and reading the stored data; a switch for outputting either of the reception signal from the receiving circuit or the read data, the single digital signal processor further including: a reception signal processing portion including a decoder for decoding an output of the switch, a time-expansion portion for time-expanding an output of the decoder, and a d/a converter for converting an output of the time-expansion portion into an analog voice signal; an adder for adding the first voice signal to the analog voice signal; a voice generating portion for generating and outputting a second voice from an output of the adder, the single digital signal processing portion further including: a recording signal processing portion including a second a/d converter for a/d-converting an output of the adder to second voice data, a second time-compression portion for time-compressing an output of the second a/d converter to output the second voice data for at least a frame timing of the voice frame interval other than the first and second frame timing, and a first coder for coding an output of the second time-compression portion and generating second coded voice data, the memory circuit storing the second coded voice data as the data in a recording mode, the memory circuit and the switch supplying the read data to the reception signal processing portion in a playback mode; and a time-division-multiplex operation portion responsive to a frame signal for operating the first coder, the second coder, and the decoder in a time-division-multiplex mode.

According to the present invention, a third telephone apparatus with recording and playback functions is provided, which comprises: a microphone for receiving a voice and generating a first voice signal; a transmission signal processing portion including a first a/d converter for a/d-converting the first voice signal, and a first coder for coding the first voice signal from the a/d converter; a voice presence detection portion responsive to the transmission signal processing portion for detecting the presence of the first voice signal by the voice parameter of the transmission signal processing portion; a transmission circuit for generating and transmitting a transmission signal from the first voice signal from the transmission signal processing portion to a network; a receiving circuit for receiving a reception signal from the network; a memory circuit for storing data in a recording mode and reading the stored data in a playback mode; a first switch responsive to the voice presence detection portion for supplying the first voice signal from the transmission signal processing portion to the memory circuit as the data when the voice signal detection circuit detects the presence of the first voice signal and outputting the reception signal to the memory circuit as the data when the voice presence detection portion detects the absence of the first voice signal; a second switch for outputting the read data in a playback mode and the reception signal from the receiving circuit in a non-playback mode; a reception signal processing portion including a decoder for decoding an output of the second switch, and a d/a converter for converting an output of the decoder into an analog voice signal; a voice generating portion for generating and outputting a second voice from an output of the reception signal processing portion.

According to the present invention, a fourth telephone apparatus with recording and playback functions is provided, which comprises: a microphone for receiving a voice and generating a first voice signal; a transmission signal processing portion including a first a/d converter for a/d-converting the first voice signal, a first coder for coding the first voice signal from the a/d converter, and an error check coder for generating first coded data with first error check data from the first coder; a transmission circuit for generating and transmitting a transmission signal from the first coded data to a network; a voice presence detection portion responsive to the transmission signal processing portion for detecting the presence of the first voice signal by the voice parameter of the transmission signal processing portion; a transmission circuit for generating and transmitting a transmission signal from the first voice signal from the transmission signal processing portion to a network; a receiving circuit for receiving a reception signal from the network; an error correction portion for correcting the reception signal from the receiving circuit using second error check data included in the reception signal; a frame condition detection portion responsive to a frame signal indicative of a frame interval and the error correction portion for detecting a frame condition of the reception signal for the frame interval and generating frame condition data; a data adding portion responsive to the frame signal for adding frame condition data to the reception signal from the error correction portion; a memory circuit for storing data in a recording mode and reading the stored data in a playback mode; a first switch responsive to the voice presence detection portion for supplying the first voice signal from the transmission signal processing portion to the memory circuit as the data to store the data when the voice signal detection circuit detects the presence of the first voice signal and outputting the reception signal to the memory circuit as the data to store the data when the voice presence detection portion does not detects the presence of the first voice signal; a second switch for outputting the read data in a playback mode and the reception signal from the receiving circuit in a non-playback mode; a reception signal processing portion including a decoder for decoding an output of the second switch, and a d/a converter for converting an output of the decoder into an analog voice signal; a voice generating for generating and outputting a second voice from an output of the reception signal processing portion; a data detection portion for detecting the frame condition data in an output of the second switch; and a memory control portion for inhibiting the memory to store the data in the recording mode when the frame condition data indicates a good voice frame condition.

In the fourth telephone apparatus, the error correction portion generates error corrected data every frame interval and the frame condition detection portion detects the frame condition from the error bit data, the memory control portion inhibits the memory to store the data in the recording mode when the frame condition data indicates that a value of the error bit data is greater than predetermined value.

In the fourth telephone apparatus, the frame condition detection portion detects the frame condition from the reception signal from the error correction portion and the memory control portion inhibits the memory to store the data in the recording mode when the frame condition data indicates that the reception signal from the error correction portion is silence frame data.

BRIEF DESCRIPTION OF THE DRAWINGS

The object and features of the present invention will become more readily apparent from the following detailed description taken in conjunction with the accompanying drawings in which:

FIG. 3 is a block diagram of a telephone apparatus of a second embodiment;

The same or corresponding elements or parts are designated with like references throughout the drawings.

DETAILED DESCRIPTION OF THE INVENTION

Hereinbelow will be described a first embodiment of this invention.

Figure 1:
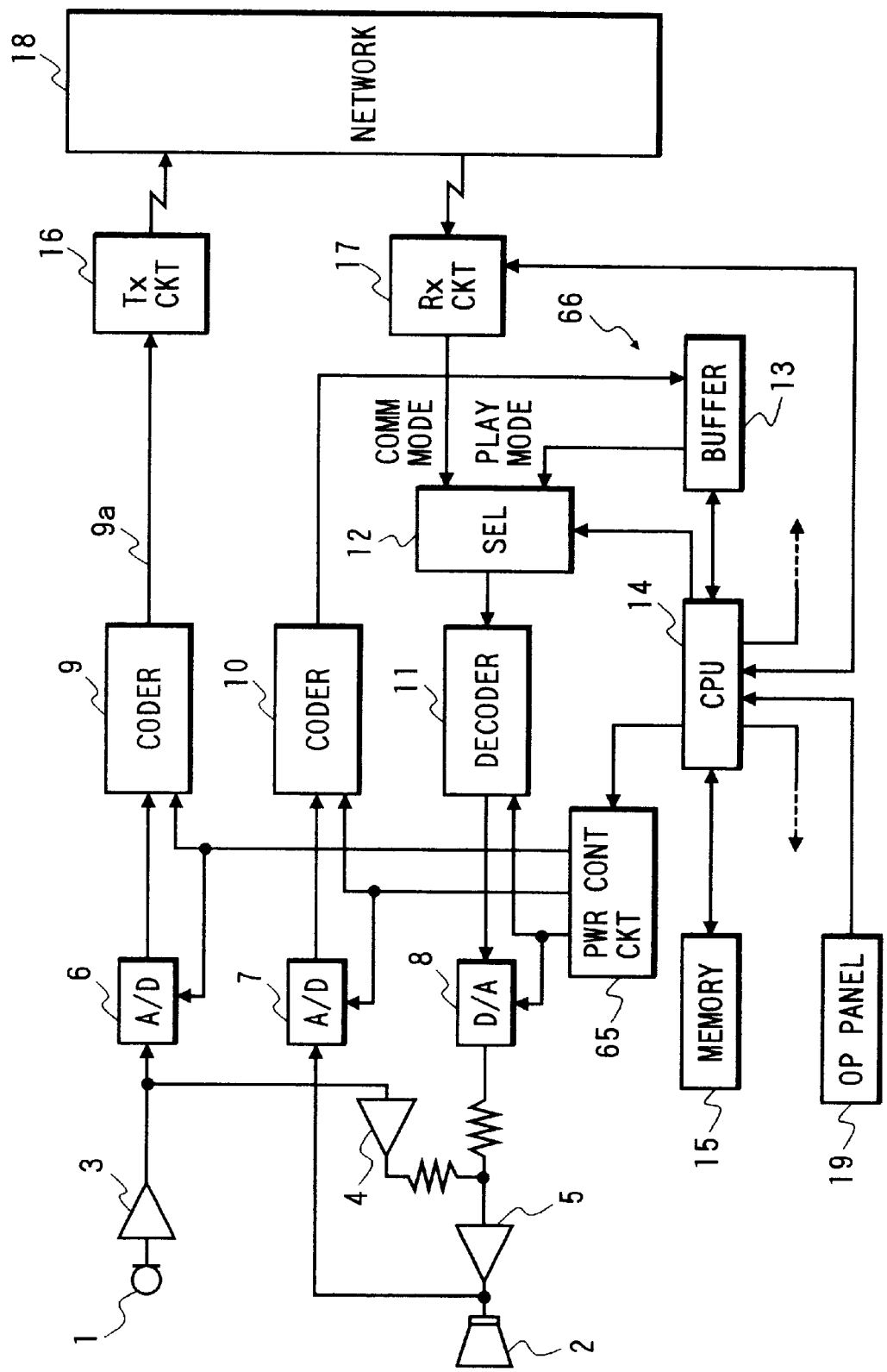
FIG. 1 is a block diagram of a telephone apparatus with a recording function according to a first embodiment.

FIG. 1 is a block diagram of a telephone apparatus with recording and playback functions according to the first embodiment.

The telephone apparatus of the first embodiment comprises a microphone 1 for receiving a voice and generating a first voice signal, an amplifier 3 for amplifying the first voice signal, a first a/d converter 6 for a/d-converting the first voice signal from the amplifier 3 to first voice data, a first coder 9 for coding the first voice data to supply a first coded voice data 9a through a high-efficient compression-coding processing, a transmission circuit 16 for generating and transmitting a transmission signal from the first coded voice data to a network 18, a receiving circuit 17 for receiving a reception signal from the network 18, a memory circuit including a buffer 13 and a memory 15 for storing data and reading the stored data, a selector 12 for outputting either of the reception signal from the receiving circuit 17 or the read stored data from the memory circuit 66, a decoder 11 for decoding an output of the selector 12, a d/a converter for d/a-converting an output of the decoder to analog voice signal, an amplifier 5 for adding the first voice signal as a side tone signal to the analog voice signal, an ear piece (speaker) 2 for generating a voice in accordance with an output of the amplifier 5, a second a/d converter 7 for a/d-converting an output of the amplifier 5 to a second voice data, and a second coder 10 for coding the second voice data to generate second coded voice data through the high-efficient compression-coding processing. The memory circuit 66 stores the second coded voice data in a recording mode and supplies the read data to the selector 12 in a playback mode.

The central processing unit (cpu) 14 switches the selector 12 in response to a command from an operation panel 19 and effects various control operations in response to an operation panel 19 or a call from the network 18. A power control circuit 65 controls power consumption in the a/d converters 6 to 8 and the coders 9 and 10, and the decoder 11 under control of the central processing unit 14. The transmission circuit and the receiving circuit may be coupled to the network 18 through a cable or the transmission circuit 16 and the receiving circuit 17 may comprise a common antenna for transmission and reception and a duplexer for transmission and reception which are omitted in FIG. 1.

An operation will be described.

The microphone 1 receives a voice and generates a first voice signal. The amplifier 3 amplifies the first voice signal. The first a/d converter 6 a/d-converts the first voice signal from the amplifier 3 to output first voice data. The first coder 9 codes the first voice data and generates a first coded voice data 9a through a high-efficient compression-coding processing. The transmission circuit 16 generates and transmits the transmission signal from the first coded voice data to the network 18. The transmission circuit 16 transmits the transmission signal to the network 18 through a cable or an antenna (not shown) and receives the reception signal through the cable or the antenna.

The receiving circuit 17 receives the reception signal from the network 18. The decoder 11 decodes the reception signal from the receiving circuit 17 in a communication mode and decodes the output of the buffer 13 through a selection by the selector 12 in a playback mode. The d/a converter 8 d/a-converts the output of the decoder 11 to analog voice signal. The amplifier 5 adds the first voice signal as the side tone signal to the analog voice signal from the d/a converter 8 with a gain of the side tone adjusted. The ear piece 2 generates the voice in accordance with an output of the amplifier 5.

The second a/d converter 7 a/d-converts the output of the amplifier 5 to a second data. The second coder 10 codes the second voice data to output second coded voice data through the high-efficient compression-coding processing. The memory circuit 66 stores the voice data from the coder 10 in recording modes (recording in a communication mode and recording in a standby mode). The memory circuit 66 reads and supplies the stored data to the decoder 11 in the playback mode.

The central processing unit 14 switches the selector 12 in response to the command from the operation panel 19, that is, the central processing unit 14 stores the voice data from the coder 10 in the memory 15 in response to recording commands (a recording command in the communication mode and a recording command in standby mode) from the operation panel 19.

The central processing unit 14 enters the communication mode in response to a dialing operation to the operation panel 19 and a call from the network 18.

Figure 2:
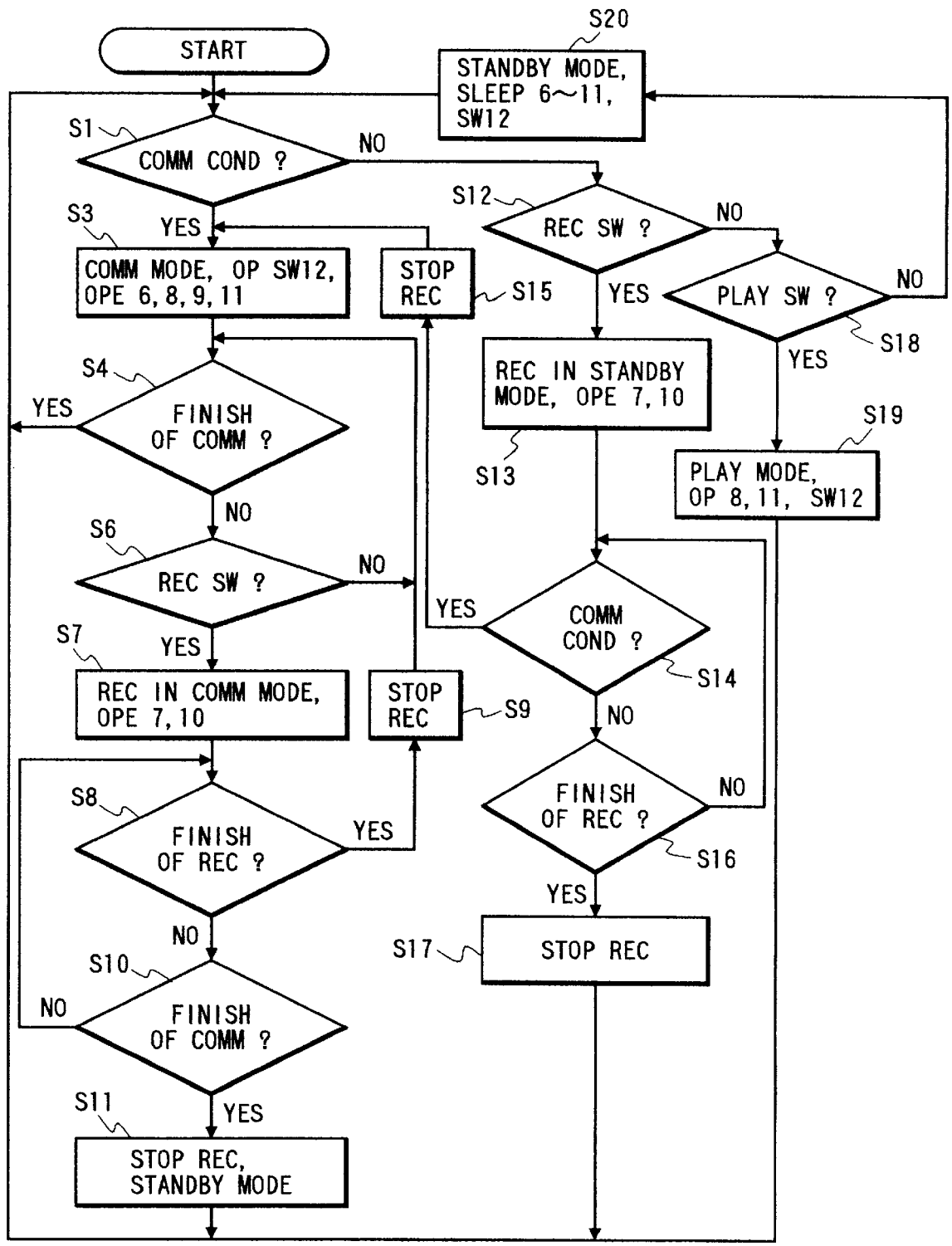
FIG. 2 depicts a flow chart showing the control operation of the central processing unit shown in FIG. 1.

FIG. 2 depicts a flow chart showing the control operation of the central processing unit 14 which is derived from a program stored in the central processing unit 14.

In standby mode, through processings steps s1, s12, s18, and s20, the central processing unit 14 waits a call from the network 18 or a dialing operation through the operation panel 19 in step s1, a record command in the standby mode from the operation panel 19 in step s12, and a playback command from the operation panel 19 in step s18.

If the record command in the standby mode is detected in step s12, the central processing unit 14 stores the voice data from the coder 10 in step s13.

If the playback command in the standby mode is detected in step s18, the central processing unit 14 plays back the voice data in the memory 15 in step s19 with the selector 12 switched to supply the read data to the decoder 11.

In communication mode, that is, in the condition that a dialing operation is performed, a call arrives, and the network is connected to this telephone apparatus in step s1, the telephone apparatus enters the communication mode in step s3, that is, the central processing unit 14 switches the selector to supply the reception signal from the receiving circuit 17 to the decoder 11. In the communication mode, if there is the recording command in the communication mode from the operation panel 19, the central processing unit 14 records the coded voice data from the coder 10.

The central processing unit 14 controls the power control circuit 65 to control power consumption in the a/d converters 6 to 8 and the coders 9 and 10, and the decoder 11 under control of the central processing unit 14 as mentioned above.

In step s20, that is, in the standby mode, the central processing unit 14 controls the power control circuit 65 to suppress power consumption in the a/d converters 6 to 8, the coders 9 and 10, and the decoder 11 and switches the selector 12 to th side of the receiving circuit 17.

In the communication mode in step s3, the central processing unit 14 switches the selector 12 to the side of the receiving circuit 17 and operates the a/d converters 6 and 8, and the coder 9, and the decoder 11 using the power control circuit 65 to communicate with a third party through the network 18. Moreover, in the communication mode, the recording command is detected in step s6, the central processing unit 14 operates the a/d converter 7 and the coder 10 to store the coded voice data from the coder 10 in the memory 15.

In step s13, there is the record command in the standby mode, the central processing unit 14 operates the a/d converter 7 and the coder 10 through the power control circuit 65, that is, the central processing unit 14 sleeps the a/d converters 6 and 8, the coder 9, and the decoder 11.

In the playback mode in step s19, the central processing unit 14 operates the decoder 11 and the d/a converter 8 to playback the read data from the memory 15, that is, the central processing unit 14 sleeps the a/d converters 6 and 7, and the coders 9 and 10.

A second embodiment will be described. FIG. 3 is a block diagram of a telephone apparatus of a second embodiment.

The telephone apparatus of the second embodiment has substantially the same structure as the telephone apparatus of the first embodiment. The difference is that the a/d converting operations, the d/a converting operation, the coding operation, and the decoding operation are provided by a single digital signal processor (DSP) by a time-division multiplex operation.

Figure 4A:
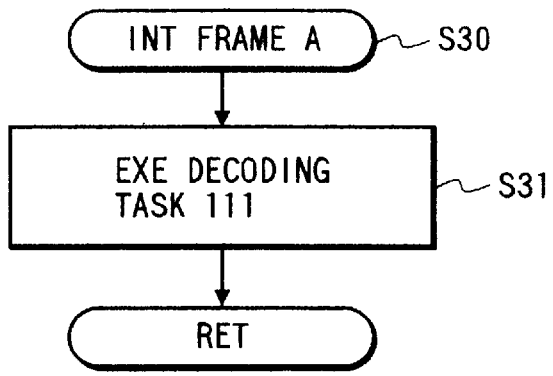
FIGS. 4A to 4C depict flow charts of the second embodiment showing operation of the central processing unit.
Figure 4B:
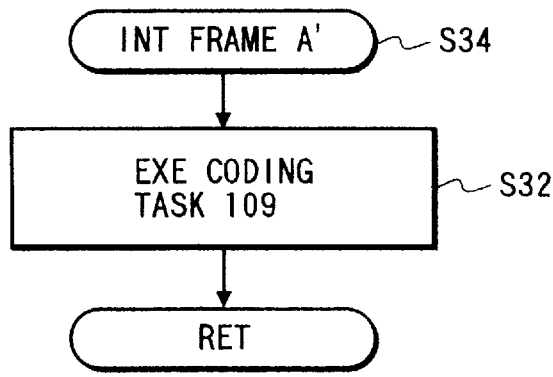
Figure 4C:
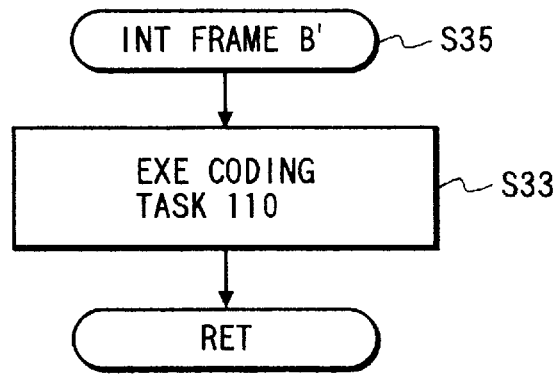

FIGS. 4A to 4C depict flow charts of the second embodiment showing operation of the central processing unit 14.

Because the network to be coupled to this telephone apparatus of the second embodiment communicates with the telephone apparatus by digital method and the coding and decoding operations can be provided by the time-division multiplex operation by the single DSP 20.

The central processing unit 14 executes a decoding task 111 for decoding the output of the selector 12, in step s31, in response to an interruption of frame A which is one of receiving intervals of voice frame. The central processing unit 14 detects the timing of the frame A in response to a frame signal 67 from a frame signal detection circuit 68 responsive to the receiving circuit 17. The decoding task 111 decodes the output of the selector 12, the time-expansion task 64 time-expands the coded voice signal from the decoding task 111, and a d/a converting task 108 d/a-converts an output of the time-expansion task 64.

The central processing unit 14 executes a coding task 109 for coding the output from the amplifier 3, in step s32, in response to an interruption of frame A' which is one of transmission intervals of voice frame. The central processing unit 14 detects the timing of the frame A' in response to the frame signal 67 from the frame signal detection circuit 68 responsive to the receiving circuit 17. A a/d converting task 106 a/d-converts the output of the amplifier 3 and the time-compression task 62 time-compresses and outputs an output of the a/d converting task 106 for the frame A'. The coding task 109 codes the output of the time-compression task 62 for the frame interval A'.

The central processing unit 14 executes a coding task 110 for coding the output from the amplifier 5, in step s33, in response to an interruption of frame B' which is one of transmission intervals of voice frame other than the frame A'. The central processing unit 14 detects the timing of the frame B' in response to the frame signal 67 from the frame signal detection circuit 68 responsive to the receiving circuit 17. An a/d converting task 107 a/d-converts the output of the amplifier 5 and the time-compression task 63 time-compresses and outputs an output of the a/d converting task 107 for the frame B'. The coding task 110 codes the output of the time-compression task 63 for the frame interval B'.

As mentioned, the time division multiplex operation by the single DSP 20 is provided. However, the a/d converting tasks 106 and 107, and the d/a converting task 108 are not operated in the time-division multiple manner.

On the other hand, the power save operation is provided as similar to the first embodiment by selectively executing the a/d converting task 106, the time compression task 62, and coding task 109, the a/d converting task 107, the time compression task 63, and coding task 109, or the the decoding task 111, the time-expansion task 64, and the d/a conversion task 108.

A third embodiment will be described.

Figure 5:
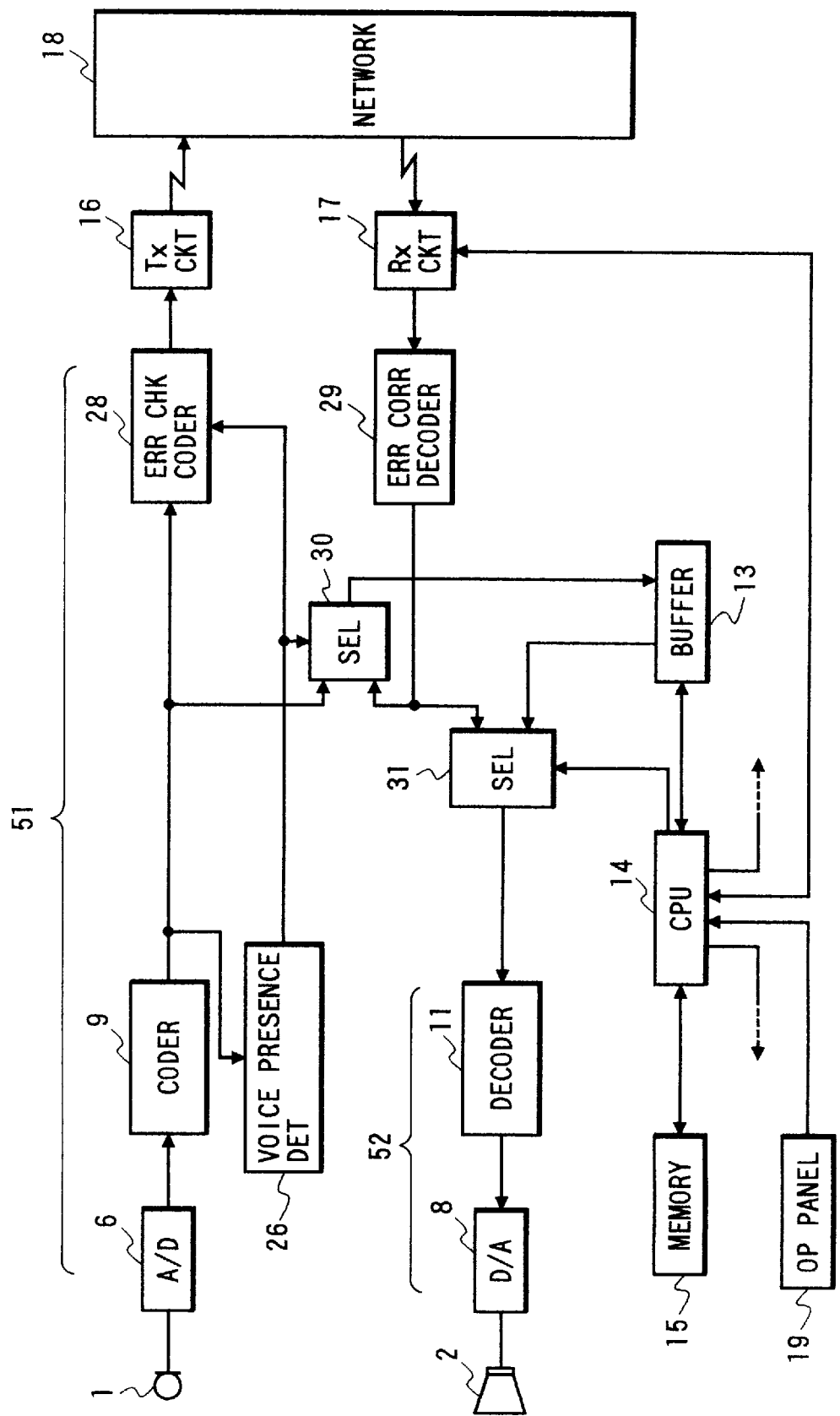
FIG. 5 is a block diagram of a telephone apparatus of a third embodiment.

FIG. 5 is a block diagram of a telephone apparatus of the third embodiment.

The telephone apparatus of the third embodiment comprises a microphone 1 for receiving a voice and generating a first voice signal; a transmission signal processing portion 51 including a first a/d converter 6 for a/d-converting the first voice signal, and a coder 9 for coding the first voice signal from the a/d converter; a voice presence detection circuit 26 responsive to the coder 9 for detecting the presence of the first voice signal by the voice parameter of the transmission signal processing portion and an error check coder 28 for generating voice data with error check code from the first voice signal from the coder 9; a transmission circuit 16 for generating and transmitting a transmission signal from the first voice signal from the transmission signal processing portion 51 to a network 18; a receiving circuit 17 for receiving a reception signal from the network 18; a buffer 13 and a memory circuit 15 for storing data and reading the stored data; a first selector 30 responsive to the voice presence detection circuit 26 for supplying the first voice signal from the coder 9 to the buffer 13 as the data when the voice presence detection circuit 26 detects the presence of the first voice signal and outputting the reception signal to the memory circuit 15 as the data when the voice presence detection circuit 26 does not detects the presence of the first voice signal; a second selector 31 for outputting either of the reception signal from the receiving circuit or the read stored data; a reception signal processing portion 52 including a decoder 11 for decoding an output of the second switching means, and a d/a converter 8 for converting an output of the decoder 11 into an analog voice signal; an ear piece 2 for generating a second voice from an output of the reception signal processing portion. The memory circuit 15 stores the second coded voice data in a recording mode and supplying the read stored data in a playback mode to the second selector 31 in a playback mode.

The microphone 1 receives a voice and generates a first voice signal. The first a/d converter 6 a/d-converter the first voice signal. The coder 9 codes the first voice signal from the a/d converter 6. The voice presence detection circuit 26 responsive to the coder 9 detects the presence of the first voice signal every voice frame by the voice parameter of the transmission signal processing portion. The error check coder 28 generates voice data with error check code from the first voice signal from the coder 9. The transmission circuit 16 generates and transmits a transmission signal from the first voice signal from the error check coder 28 to the network 18 such as a digital telephone line. The receiving circuit 17 receives a reception signal from the network 18. The buffer 13 and the memory 15 store data from the selector 30 every voice frame under control of the central processing unit 14 and reading the stored data. The first selector 30 responsive to the voice presence detection circuit 26 supplies the first voice signal from the coder 9 to the buffer 13 as the data when the voice presence detection circuit 26 detects the presence of the first voice signal and outputs the reception signal to the memory circuit 15 as the data when the voice presence detection circuit 26 does not detects the presence of the first voice signal. The second selector 31 outputs the reception signal from the receiving circuit in a communication (non-playback) mode and the read data in a playback mode. The decoder 11 decodes the output of the second selector 31. The d/a converter 8 d/a-converts an output of the decoder 11 into an analog voice signal. The ear piece 2 generates a second voice from an output of the reception signal processing portion. The memory circuit 15 stores the second coded voice data in a recording mode and supplies the read data to the second selector 31 in the playback mode.

The error check coder 28 supplies no data when the voice presence detection circuit 26 does not detects the presence of the first voice signal, that is, the transmission data of the transmission signal processing portion does not have the voice parameter.

The selector 30 is controlled by the voice presence detection circuit 26 without controlling by the central processing unit 14, so that the first transmission voice is recorded prior to the voice signal in the reception signal. In other words, the first voice is recorded irrespective of the presence of the voice in the reception signal. The voice presence detector 26 further controls the error check coder 28 to provide a discontinuous transmission every voice frame. That is, when there is substantially no voice, the voice presence detection circuit 26 stops transmission of the voice data.

A fourth embodiment will be described.

Figure 6:
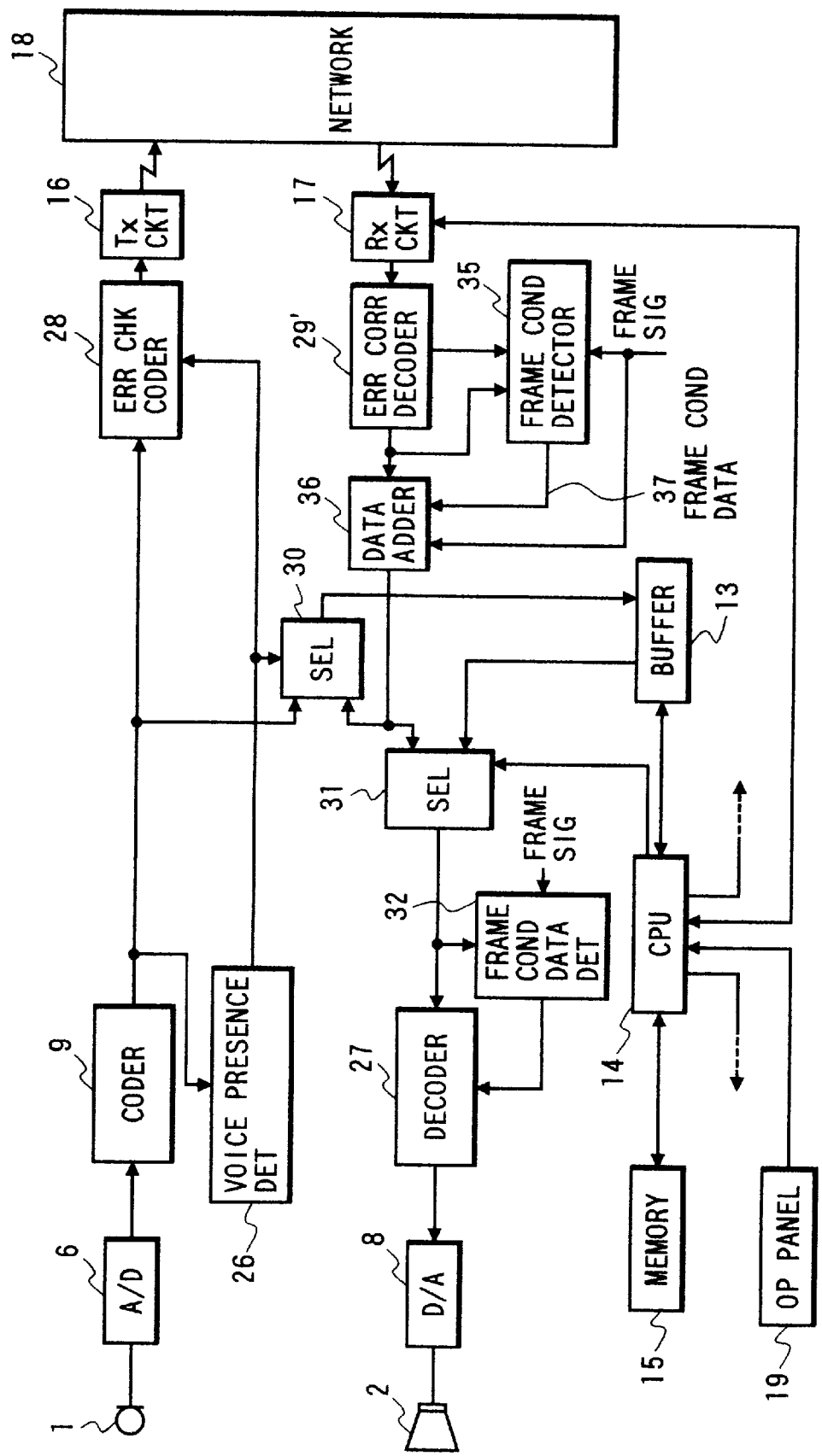
FIG. 6 is a block diagram of the telephone apparatus of a fourth embodiment.

FIG. 6 is a block diagram of the telephone apparatus of the fourth embodiment.

The telephone apparatus of the fourth embodiment has substantially the same structure as that of the third embodiment. The difference is that a frame condition detector 35, a data adder 36, a frame condition data detector 32 are added. Moreover, the decoder 27 replaces the decoder 11, an error correction decoder 29' replaces the error correction decoder 29, and the central processing unit 14 stores the data from the selector 30 in the memory 15 in accordance with the frame condition data.

The transmission signal is transmitted as similar to he third embodiment.

The reception signal is received by the receiving circuit 17. The error correction decoder 29' effects the error correction as similar to the third embodiment, that is, error corrected voice data is outputted every voice frame. Moreover, the error correction decoder 29' detects an error bit and supplies error bit data to the frame condition detector 35 every voice frame. The frame condition detector 35 detects a frame condition from the error bit data and generates frame condition data. The data adder 36 adds (attaches) the frame condition data to the error corrected voice data of a voice frame at a predetermined position of the voice frame.

Each voice frame of the voice data and the frame condition data is supplied to the selectors 30 and 31.

The voice frame of the voice data and the frame condition data is supplied to the decoder 27 and to the frame condition data detector 32 in a communication condition. The frame condition data detector 32 detects the frame condition data at the predetermined position in each frame in response to the frame signal. The decoder 27 decodes the received voice data every voice frame in accordance with the detected frame condition data from the frame condition data detector 32 to provide an adaptive decoding.

Figure 7:
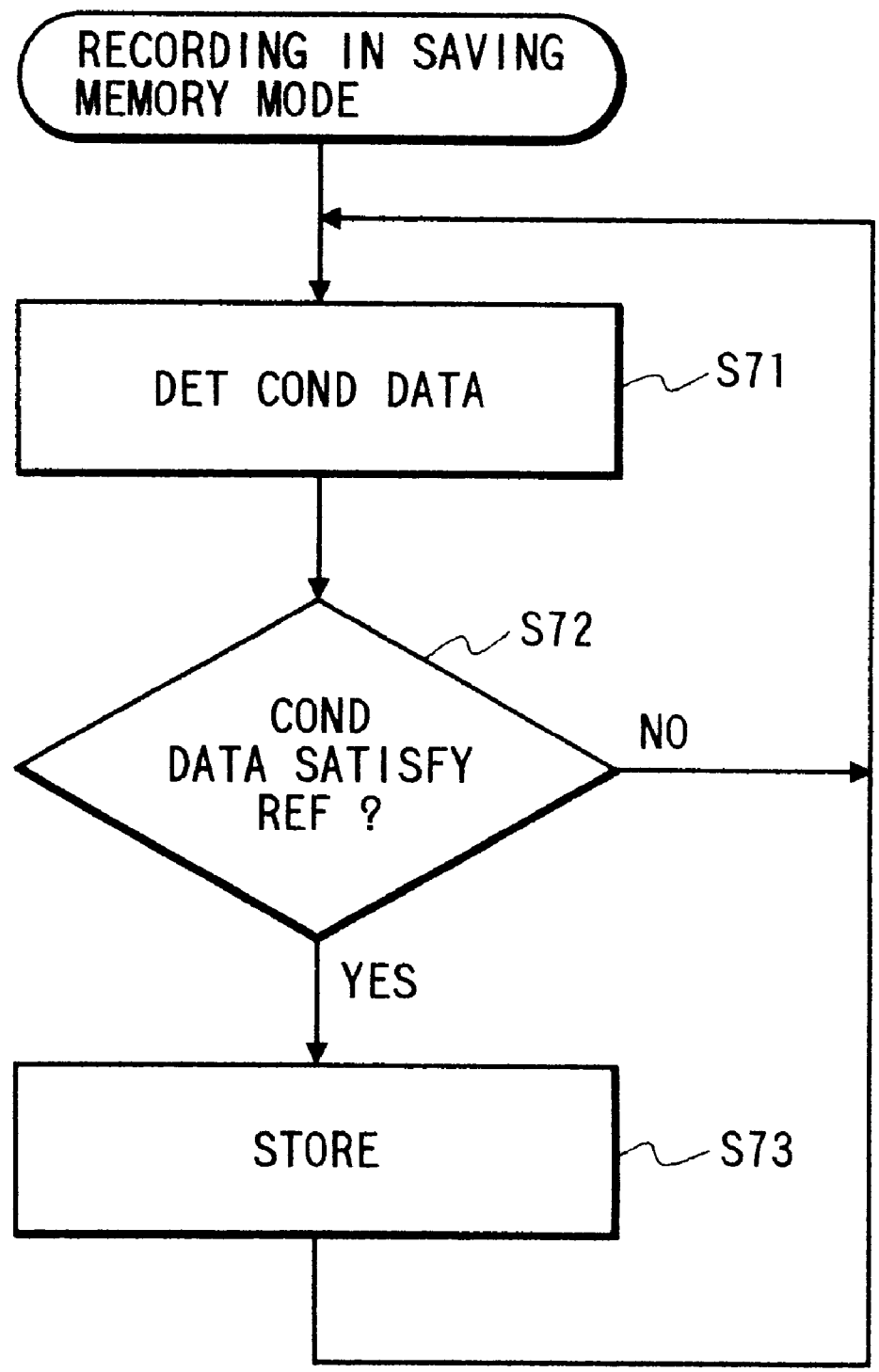
FIG. 7 depicts a flow chart of the fourth embodiment.

FIG. 7 depicts a flow chart of the fourth embodiment.

The central processing unit 14 stores the voice data from the selector 30 in accordance with the frame condition data in every frame. In a save memory recording mode, the central processing unit 14 detects the conditional data in step s71 and in step s72, the central processing unit 14 makes a decision as to whether the conditional data satisfies a predetermined condition (reference). If the conditional data satisfies the predetermined condition, that is, the receiving condition is good, the central processing unit 14 stores the received voice data in step s73. If the conditional data does not satisfy the predetermined condition in step in s72, the central processing unit 14 does not store the received voice data. That is, the central processing unit 14 selectively stores the received voice data in accordance with the frame condition data indicative of the receiving condition of the voice data.

The frame condition detector 35 further response to the error corrected voice data and detects a mute condition of the received voice data every frame and generates the frame condition data having a value indicative of the mute condition. The frame condition detector 35 detects the mute condition by checking the error bit data whether bad voice frame or silence frame.

The frame condition data indicative of the mute condition every frame is added to every frame of the error corrected voice data by the data adder 36. The frame condition data indicative of the mute condition is detected and used as mentioned above. That is, if the frame condition data indicates the mute condition ,the central processing unit 14 does not store the received voice data to save an area of the memory used.

The frame condition detector 32 detects the frame condition data from the output of the selector 31. the decoder 27 decodes the output of the selector 31 in accordance with the output of the frame condition data detector 32. That is, if the frame condition data indicates that the receiving condition is not good, the decoder 27 stops outputting the voice data to the d/a converter 8 to suppress noisy voice from the ear piece 2.

Because the condition data is added to the output of the error correction decoder 29', so that the condition data is supplied to the frame condition data detector 32 directly from the data adder 36 and also via the memory 15. Since the voice data from the microphone is not subject to an affection during transmission and reception, the addition of the conditional data is not necessary.

What is claimed is:

1. A telephone apparatus with recording and playback functions comprising:

a microphone (1) for receiving a first voice and generating a first voice signal;

transmission signal processing means including a first a/d converter (6) for a/d-converting said first voice signal to first voice data, and a first coder (9) for coding said first voice data and generating first coded voice data;

a transmission circuit (16) for generating and transmitting a transmission signal from said first coded voice data to a network;

a receiving circuit (17) for receiving a reception signal from said network;

a memory circuit (13, 15) for storing data and reading said stored data;

switching means (12) for outputting either of said reception signal from said receiving circuit or the read data;

reception signal processing means including a decoder (11) for decoding an output of said switching means, and a d/a converter (8) for d/a-converting an output of said decoder into an analog voice signal;

an amplifier (5) for adding said first voice signal to said analog voice signal;

voice generating (2) for generating a second voice from an output of said amplifier; and recording signal processing means including a second a/d converter (7) for a/d-converting an output of said amplifier to second voice data, and a second coder (10) for coding said second voice data and generating second coded voice data, said memory circuit storing said second coded voice data as said data in a recording mode, said memory circuit and said switching means supplying the read data to said reception signal processing means in a playback mode.

2. A telephone apparatus as claimed in claim 1, further comprising:

communication detection means (14) responsive to an operation switch and said receiving circuit for detecting a non-communication condition; and sleep mode control means for making said transmission signal processing means and said reception processing means in a sleeping condition in said detected non-communication condition, making said recording signal processing means in an operation condition in recording mode, and making said reception signal processing means in another operation condition in said playback mode to play back the read data from said memory circuit.

3. A telephone apparatus with recording and playback functions for communicating with a digital network comprising:

a microphone (1) for receiving a first voice and generating a first voice signal;

a single digital signal processor including:

transmission signal processing means including a first a/d converter (106) for a/d-converting said first voice signal to first voice data, time-compression means for time-compressing said first voice data to output said first voice data for a first frame (s34) of a voice frame interval, and a first coder (109) for coding said first voice data from said time-compression means and generating first coded voice data;

a transmission circuit (16) for generating and transmitting a transmission signal from said first coded voice data to said digital network;

a receiving circuit (17) for receiving a reception signal from said digital network for a second frame (s30) of said voice frame interval;

a memory circuit (13, 15) for storing data and reading said stored data;

switching means (12) for outputting either of said reception signal from said receiving circuit or the read data, said single digital signal processor further including:

reception signal processing means including a decoder (111) for decoding an output of said switching means, time-expansion means (64) for time-expanding an output of said decoder, and a d/a converter (108) for converting an output of said time-expansion means into an analog voice signal;

an amplifier (5) for adding said first voice signal to said analog voice signal;

voice generating means (2) for generating and outputting a second voice from an output of said amplifier, said single digital signal processing means further including:

recording signal processing means including a second a/d converter (107) for a/d-converting an output of said amplifier to second voice data, second time-compression means (63) for time-compressing an output of said second a/d converter to output said second voice data for at least a frame (s35) of said voice frame interval other than said first and second frame, and a first coder (110) for coding an output of said second time-compression means and generating second coded voice data, said memory circuit storing said second coded voice data as said data in a recording mode, said memory circuit and said switching means supplying the read data to said reception signal processing means in a playback mode; and time-division-multiplex operation means (14) responsive to a voice frame signal (67) for operating said first coder, said second coder, and said decoder in a time-division-multiplex mode.

4. A telephone apparatus with recording and playback functions comprising:

a microphone (1) for receiving a voice and generating a first voice signal;

transmission signal processing means Including a first a/d converter (6) for a/d-converting said first voice signal, and a first coder (9) for coding said first voice signal from said a/d converter;

voice presence detection means (26) responsive to said transmission signal processing means for detecting the presence of said first voice signal by the voice parameter of the transmission signal processing portion;

a transmission circuit (16) for generating and transmitting a transmission signal from said first voice signal from said transmission signal processing means to a network;

a receiving circuit (17) for receiving a reception signal from said network;

a memory circuit (13, 15) for storing data in a recording mode and reading said stored data in a playback mode;

first switching means (30) responsive to said voice presence detection means for supplying said first voice signal from said transmission signal processing means to said memory circuit as said data when said voice presence detection means detects the presence of said first voice signal and outputting said reception signal to said memory circuit as said data when said voice presence detection means detects the absence of said first voice signal;

second switching means (31) for outputting the read data in a playback mode and said reception signal from said receiving circuit in a non-playback mode;

reception signal processing means including a decoder (11) for decoding an output of said second switching means, and a d/a converter (8) for converting an output of said decoder into an analog voice signal; and voice generating (2) for generating and outputting a second voice from an output of said reception signal processing means.

5. A telephone apparatus with recording and playback functions comprising:

a microphone (1) for receiving a voice and generating a first voice signal;

transmission signal processing means including a first a/d converter (6) for a/d-converting said first voice signal, a first coder (9) for coding said first voice signal from said a/d converter, and an error check coder for generating first voice data with first error check data from said first voice signal from said first coder;

a transmission circuit (16) for generating and transmitting a transmission signal from said first voice data and said first error check data to a network (18);

voice presence detection means (26) responsive to said transmission signal processing means for detecting the presence of said first voice signal by the voice parameter of the transmission signal processing portion;

a transmission circuit (16) for generating and transmitting a transmission signal from said first voice signal from said transmission signal processing means to a network;

a receiving circuit (17) for receiving a reception signal from said network;

error correction means for correcting said reception signal from said receiving circuit using second error check data included in said reception signal;

frame condition detection means responsive to a frame signal indicative of a frame interval and said error correction means for detecting a frame condition of the reception signal for said frame interval and generating frame condition data;

data adding means responsive to said frame signal for adding frame condition data to said reception signal from said error correction means;

a memory circuit (13, 15) for storing data in a recording mode and reading said stored data in a playback mode;

first switching means (30) responsive to said voice presence detection means for supplying said first voice signal from said transmission signal processing means to said memory circuit as said data to store said data when said voice presence detection means detects the presence of said first voice signal and outputting said reception signal to said memory circuit as said data to store said data when said voice presence detection means does not detects the presence of said first voice signal;

second switching means (31) for outputting the read data in a playback mode and said reception signal from said receiving circuit in a non-playback mode;

reception signal processing means including a decoder (11) for decoding an output of said second switching means, and a d/a converter (8) for converting an output of said decoder into an analog voice signal;

voice generating means (2) for generating and outputting a second voice from an output of said reception signal processing means;

data detection means (s71) for detecting said frame condition data in an output of said second switching means; and memory control means (14) for inhibiting said memory to store said data in said recording mode when said frame condition data indicates a predetermined condition.

6. A telephone apparatus as claimed as claim 5, wherein said error correction means generates error corrected data every said frame interval and said frame condition detection means detects said frame condition from said error bit data, said memory control means inhibits said memory to store said data in said recording mode when said frame condition data indicates that a value of said error bit data is greater than predetermined value.

7. A telephone apparatus as claimed as claim 5, wherein said frame condition detection means detects said frame condition from said reception signal from said error correction means and said memory control means inhibits said memory to store said data in said recording mode when said frame condition data indicates that said reception signal from said error correction means is silence frame data.

* * * * *